United States Patent Office 3,549,587
Patented Dec. 22, 1970

3,549,587
STABILISATION OF POLYMERS
Eric Samuel Nicholson and Vijay Ratna Sharma, Manchester, England, assignors to Imperial Chemical Industries Limited, London, England, a corporation of Great Britain
No Drawing. Filed Jan. 4, 1968, Ser. No. 695,575
Claims priority, application Great Britain, Jan. 6, 1967, 972/67; Oct. 2, 1967, 44,778/67
Int. Cl. C08f 45/60
U.S. Cl. 260—45.8                                            8 Claims

ABSTRACT OF THE DISCLOSURE 3,5-dialkyl-4-hydroxybenzylamines, preferably in conjunction with other antioxidants, are added to polymers and copolymers of branched chain mono-α-olefins containing at least 5 carbon atoms to improve their heat stability. The highest stabilising effect is shown by di(3,5-ditert.-alkyl-4-hydroxybenzyl)ethanolamines.

This invention relates to a process for improving the stability of solid polymers and copolymers of branched chain mono-α-olefins containing at least 5 carbon atoms.

Solid polymers and copolymers of olefins in general are materials useful as, for example, plastics, fibres or elastomers. During manufacture, fabrication or use these materials are normally subjected to high temperatures which, depending upon the circumstances such as the presence or absence of oxygen and the particular temperature concerned, may cause a progressive deterioration in their physical properties.

The melting or softening points and upper service temperatures of the hitherto well-known polyolefins, for example polyethylene, polypropylene or polybutane-1, are below 200° C. although higher temperatures may be necessary for fabrication such as injection moulding or extrusion. At these temperatures with access of air there is a progressive uptake of oxygen by these polymers with a deterioration of the useful properties of the polymer. The onset of this attack by oxygen can be greatly retarded by the addition to the polymer of antioxidants, and the service life of articles made from the polyolefin thereby greatly increased. It has therefore been normal practice to add antioxidants to these polymers.

The polymers and copolymers with which this invention is concerned are generally of regular steric structure and may be prepared, for example by using catalysts derived from a reducing metal, metal hydride, metal alkyl, or metal alkyl halide which is reacted with a transition metal compound in one or more stages.

These polymers and copolymers have much higher melting points than the hitherto well-known polyolefins; for example poly-4-methylpentene-1 melts about 246° C., poly-3-methylbutene-1 at 310° C., and poly-3-methylpentene-1 at 370° C. in comparison with polypropylene which melts at 165–176° C. It is therefore necessary to use higher temperatures for the compounding and fabrication of articles from these polymers than are usual in the case of, for example, polypropylene, and these polymers have higher upper service temperatures.

These higher temperatures of fabrication or use, even in the absence of oxygen or air, cause a reduction in the average molecular weight of the polymer resulting in deterioration in the useful physical properties of the polymer. This high temperature deterioration cannot be controlled to a useful extent by many of the compounds used as antioxidants in polyolefins, although some phenols and amines do have a significant stabilising effect. Some highly effective antioxidants, such as certain thio-compounds, in fact increase the rate of thermal deterioration.

It has now been found that certain phenols decrease substantially the rate of deterioration of these polymers and copolymers at temperatures normally used in fabricating such polymers, that is at temperatures up to about 350° C., without promoting degradation due to ultraviolet light.

According to the present invention therefore there is provided a process for improving the stability to heat of solid polymers and copolymers of branched-chain mono-α-olefins containing at least 5 carbon atoms which comprises incorporating into the solid polymer or copolymer a phenol of the formula

wherein A is a group of the formula

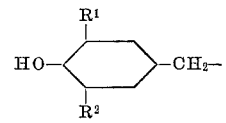

in which $R^1$ and $R^2$ are each alkyl groups containing from 1 to 12 carbon atoms or cycloalkyl groups containing from 5 to 7 carbon atoms, $R^3$ is a group A or an alkyl group containing from 1 to 12 carbon atoms, a hydroxyalkyl group containing from 1 to 12 carbon atoms or a cycloalkyl group containing from 5 to 7 carbon atoms and $R^4$ is a hydrogen atom or a group $R^3$ or alternatively $R^3$ and $R^4$ together with the nitrogen atom form a heterocyclic ring.

As examples of alkyl groups which may be represented by $R^1$, $R^2$ or $R^3$ there may be mentioned methyl, ethyl, iso-propyl, butyl, sec.-butyl, tert.-butyl, n-vinyl, tert.-octyl, nonyl and dodecyl. It is preferred that either $R^1$ or $R^1$ and $R^2$ are branched at the α-carbon atom, and preferably each contain from 4 to 8 carbon atoms as for example in tert.-butyl and tert.-octyl groups.

As examples of cycloalkyl groups which may be represented by $R^1$, $R^2$ or $R^3$ there may be mentioned cyclopentyl, cyclohexyl and α-methylcyclohexyl.

It is preferred that $R^3$ is either a hydroxyalkyl group or, particularly preferred, a group of the formula represented by A.

As examples of hydroxyalkyl groups which may be represented by $R^3$ there may be mentioned 2-hydroxyethyl, 3-hydroxypropyl, 2-hydroxypropyl.

It is preferred that $R^4$ is either an alkyl group containing from 1 to 3 carbon atoms or, particularly preferred, a hydroxyalkyl group, especially β-hydroxyethyl.

Particularly valuable compounds are also obtained when $R^3$ and $R^4$ together with the nitrogen atom form a heterocyclic ring. As examples of such compounds there may be mentioned morpholine, piperidine and piperazine in which the second nitrogen atom may carry as substituent a group A.

As examples of phenols which may be used in the process of the invention there may be mentioned N,N'-tri(3-methyl - 5 - tert.-butyl-4-hydroxybenzyl)amine; N,N,N-tri(3,5-di-tert.-butyl - 4 - hydroxybenzyl)amine; N,N-di(3,5-di-tert.-butyl-4-hydroxybenzyl) - n-butylamine; N,N-di(3 - methyl - 5 - tert.-butyl-4-hydroxybenzyl)cyclohexylamine. As preferred compounds there may be mentioned N - (3,5 - di - tert. - butyl-4-hydroxybenzyl)diethanolamine, N,N' - di(3,5 - di - tert.-butyl-4-hydroxybenzyl) piperazine, N,N - di(3,5 - di - tert.-butyl-4-hydroxybenzyl) methylamine, N,N - di(3,5 - di - tert.-butyl-4-hydroxybenzyl)ethylamine and particularly N,N - di(3,5 - di-tert.-butyl-4-hydroxybenzyl)ethanolamine.

Suitable amounts of the phenol are from 0.0001 to 1.0% of the weight of the polymer or copolymer, but it is preferred to use at least 0.001% and particularly at least 0.015%, and preferably not more than 0.25%.

The phenol may be added at any convenient stage before or at the point where its protective action needs to be exerted. If it is desired to add it during polymerisation care should be taken to see that it does not react undesirably with the catalyst and is not removed in any polymerisation diluent or during any purification treatment of the polymer.

For these reasons it will generally be convenient to add the phenol after polymerisation and after any purification treatment, very suitably together with the antioxidant or other additives if these are to be used, by any of the methods normally used to incorporate additives in solid olefine polymers, subject to the proviso below, e.g. by the addition of a solution of the additive or additives in a volatile solvent to the polymer powder, followed by evaporation of the solvent; by dry mixing by milling; by extrusion compounding; Banbury treatment or the like.

In view of the danger that substantial deterioration may occur in those processes in which the polymer or copolymer is melted before addition of the phenol, it is preferable to first mix the phenol with the polymer at lower temperatures, e.g. by the solvent method or by dry mixing, before the polymer is exposed to temperatures favouring rapid degradation.

A masterbatch technique may be found convenient, particularly if only small amounts, e.g. 0.01–0.05% of the phenol by weight, are to be incorporated.

As branched-chain mono-α-olefine polymers and copolymers which may be stabilised by the process of the invention there may be mentioned for example polymers of particularly 4-methylpentene-1 and also 3-methylbutene-1, 3-methylpentene-1, 4,4-dimethylpentene-1, 3-methylhexene-1, 4-methylhexene-1, 5-methylhexene-1, 5,5-dimethylhexene-1 and vinylcyclohexane. As copolymers there may be mentioned copolymers of these compounds with for example each other or with minor amounts of other ethylenically-unsaturated compounds especially other olefins such as ethylene, propylene, butene-1, pentene-1, hexene-1 and decene-1.

The invention also provides stabilised solid olefine polymer compositions and shaped articles (including granules) formed from the said compositions.

Other materials which may be present in the polymer or copolymer include other melt-stabilisers such as dihydroanthracene, antioxidants, cross-linking agents, blowing agents, plasticisers, fillers, nucleating agents, slip agents, anti-static agents, pigments, light stabilisers such as 2-hydroxy-benzophenones substituted benzotriazoles, metal complexes such as organo-nickel complexes, and cyanoacrylates, other organic phosphorus compounds, metal deactivators, and materials of the type used as stabilisers for polyvinyl chloride, e.g. basic inorganic materials and other HCl acceptors, for instance, epoxides and metal soaps. See, for instance, the review in Chemistry and Industry, Aug. 15, 1964, pages 1442–1455.

Metal soaps, e.g. calcium and zinc stearates, also function as lubricants and may improve the affinity of the polymer for dyes.

The use, in addition to the phenols used in the invention, of other antioxidants is frequently desirable in order to improve the stability of the polymer or copolymer at lower temperatures, particularly in presence of oxygen. The phenols have the advantage that they decrease the undesirable tendency of some of these antioxidants to lower the stability of the polymer at high temperatures.

Suitable antioxidants to be used in addition to the phenols include other phenols such as 2,6-di-tert.-butyl-4-methylphenol, 4,4'-thiobis(3-methyl-6-tert.-butylphenol, 1,3,5-trimethyl-2,4,6-tris(3',5' - tert. - butyl - 4' - hydroxybenzyl)benzene, octadecyl ester of β-(3,5-di-tert.-4-hydroxyphenyl)propionic acid, condensates of phenols with aldehydes such as crotonaldehyde or glutaraldehyde, dialkyl thiodialkanoates such as dilauryl thiodipropionate, metal dialkyldithiocarbamates such as zinc dibutyldithiocarbamate, metal dialkyldithiophosphates such as zinc dinonyldithiophosphate, trialkyltrithiophosphites, dialkylthioethers such as dihexadecylthioether, organic phosphites such as tris(nonylphenyl)phosphite, and certain organic phosphonates, and especially mixtures of two or more of these compounds since a synergistic effect is frequently observed. Particularly effective mixtures include a sulphur-free phenol and a sulphur-containing compound.

Suitable amounts of these antioxidants or antioxidant mixtures are from 0.005 to 1.0% of the weight of the polymer or copolymer, but it is preferred to use at least 0.01 and particularly at least 0.2%, and preferably not more than 0.5%.

The invention is illustrated but not limited by the following examples in which all parts and percentages are by weight unless otherwise stated.

EXAMPLE 1

Additives as listed below are dissolved in 5 parts of ethanol or a 50:50 mixture of ethanol and acetone and diluted with 45 parts of trichlorotrifluoroethane. This mixture is poured over 100 parts of a copolymer of 98% 4-methylpentene-1 and 2% of n-decene-1 in the form of a fine powder under constant stirring at a temperature of 50° C. until all the solvent is driven off. This powder mixture is moulded in an electrically heated platen press at 260° C. for one minute to give a sheet about 2 mm. thick. The sheet is cooled and cut up into small pieces. These pieces are remoulded at 260° C. and the resulting sheet once more similarly cut up. The process of moulding and cutting is done three times to ensure a uniform distribution of the additives. Finally, the cut pieces are tested in a melt-flow grader at a temperature of 280° C. using a 2 kg. load and substandard die. After an initial period of heating without load, the load is put on and the amount of material in grammes extruded in 60 seconds is determined at 5 minute intervals. The results are shown in Table I.

TABLE I

| Stabiliser in polymer | Weight in grams (× 100) extruded in 60 seconds at 280° C. after 5 minutes preheating plus additional heating for following minutes: | | | | |
| --- | --- | --- | --- | --- | --- |
| | 1 | 5 | 10 | 15 | 20 |
| B(0.25%) | 5.34 | 15.46 | 38.30 | (1) | (1) |
| B(0.25%) plus A(0.25%) | 1.80 | 1.90 | 4.00 | 10.90 | 23.10 |
| B(0.25%) plus D(0.10%) | 2.42 | 2.82 | 3.70 | 5.70 | 11.66 |
| B(0.25%) plus D(0.25%) | 2.20 | 2.56 | 3.14 | 4.12 | 6.50 |
| B(0.25%) plus E(0.10%) | 2.62 | 2.78 | 3.00 | 3.34 | 3.38 |
| B(0.25%) plus E(0.25%) | 1.74 | 1.90 | 1.90 | 2.20 | 2.44 |
| B(0.25%) plus F(0.10%) | 2.34 | 2.62 | 2.70 | 3.32 | 4.53 |
| B(0.25%) plus F(0.25%) | 1.50 | 1.58 | 1.63 | 1.75 | 1.95 |
| B(0.25%) plus G(0.10%) | 1.18 | 1.28 | 1.60 | 2.08 | 2.40 |
| C(0.25%) | 4.58 | 7.44 | 16.12 | 27.14 | (1) |
| C(0.25%) plus E(0.10%) | 1.76 | 1.83 | 1.87 | 2.05 | 2.20 |
| C(0.25%) plus E(0.25%) | 1.46 | 1.47 | 1.56 | 1.68 | 1.84 |

[1] Too fast to measure.

The additives used above are as follows:

(A) 2,6-ditert.-butyl-4-methylphenol.
(B) Commercial antioxidant sold under the name "Irganox" 1010
   ("Irganox" is a registered trademark).
(C) Commercial antioxidant sold under the name "Irganox" 1093.
(D) Tris(3,5-ditert.-butyl-4-hydroxybenzyl)amine.
(E) 1,4-bis(3,5-ditert.-butyl-4-hydroxybenzyl)piperazine.
(F) N,N - di(β - hydroxyethyl) - 3,5 - ditert. - butyl - 4 - hydroxybenzylamine.
(G) N,N - di(3,5 - ditert. - butyl - 4 - hydroxybenzyl) ethanolamine.

In the above table a higher figure indicates a lower melt viscosity and a lower figure indicates a higher melt viscosity.

amine in various specified amounts in absence of other additive. The amounts extruded in 1 minute after various times of preheating are given in Table II.

TABLE II

| Amount of stabiliser | Wt. extruded in 1 minute (g.) at 280° C. after various residence times (minutes) | | | | | | | | | | | |
|---|---|---|---|---|---|---|---|---|---|---|---|---|
| | 1 | 2 | 3 | 4 | 5 | 6 | 7 | 8 | 9 | 10 | 12 | 15 |
| None | The grader emptied in less than 1 minute | | | | | | | | | | | |
| 0.01% | 0.0444 | 0.0560 | 0.0740 | 0.1124 | 0.1320 | 0.1320 | 0.1370 | 0.1560 | 0.3610 | 0.3846 | 0.7100 | |
| 0.05% | 0.0292 | 0.0346 | 0.0376 | 0.0374 | 0.0376 | 0.0380 | 0.0394 | 0.0416 | 0.0430 | 0.0432 | 0.0570 | 0.0790 |

The antioxidants B or C themselves have little melt stabilising action. Addition of A, a known melt stabiliser, to B gives good melt stability initially but this begins to decrease after about 10 minutes heating. Addition of D, E, F or G to B or C is very effective in maintaining good melt-stability even after 20 minutes heating.

EXAMPLE 2

0.1 part of the commercial antioxidant sold under the name Irganox 1010 ("Irganox" is a registered trademark), 0.25 part of dilauryl thiodipropionate and N,N-di(3,5-ditert.-butyl-4-hydroxybenzyl)ethanolamine in the amounts listed in the table below are dissolved in 5 parts of ethanol and diluted with 45 parts of trichlorotrifluoroethane. This mixture is poured over 100 parts of a copolymer of 98% 4-methylpentene-1 and 2% of n-decene-1 in the form of a fine powder under constant stirring at a temperature of 50° C. until all the solvent is driven off. The powder is then extruded on a ¾″ extruder using a nylon-type screw with 20:1 L/D ratio at 40 r.p.m. Zone temperatures along the barrel are 188° C., 245° C., 266° C., 270° C. and 282° C. (at the die). The polymer is extruded through a 3/22″ rod die with 60° cone entry, passed through a cooling bath at about 25° C., and the lace wound up. After lace-cutting, the granules are injection moulded on a 1-ounce reciprocating screw machine. Operating temperatures along the barrel are 255° C., 265° C. and 275° C. (at the nozzle). The mould temperature is 70° C. and a 25/15 seconds injection/cooling cycle is used. The injection pressure is 25 kg. per sq. cm. The 3-impression mould produces a 2″ x 2″ x ⅛″ thick plaque.

The melt flow index of the lace/extrudate and of the injection moulding is determined by ASTM method 9238–62T modified in that a 5 kg. weight is used instead of that specified for causing extrusion and that the temperature of the polymer is maintained at 260° C.

The colour imparted to the polymer is assessed by calculating the "yellow factor" of each plaque. The percentage of light transmitted through the plaque and blue, green or red filters respectively is measured using a Colormaster, the "yellow factor" being then calculated by the formula:

Yellow factor =

$$\frac{\text{percent transmission (red)} - \text{percent transmission (blue)}}{\text{percent transmission (green)}} \times 100$$

| N,N-di(3,5-ditert-butyl-4-hydroxybenzyl)ethanolamine, percent | Melt flow, extruded lace | Index plaque | Yellow factor |
|---|---|---|---|
| None | 26 | 60 | 19.7 |
| 0.001 | 24 | 57 | 17.9 |
| 0.002 | 23 | 49 | 17.0 |
| 0.005 | 20 | 38 | 17.3 |
| 0.0075 | 19 | 37 | 17.8 |
| 0.01 | 18 | 34 | 18.2 |

EXAMPLE 3

The procedure of Example 1 is repeated using as stabiliser N,N-di(3,5-ditert.-butyl-4-hydroxybenzyl)ethanolamine as in Example 1, N,N-bis(3,5-ditert.-butyl-4-hydroxybenzyl)methylamine (H), and N,N-bis-(3,5-ditert.-butyl-4-hydroxybenzyl)-n-butylamine (I). The results are given in Table III.

TABLE III

[Weight in grams (× 100) extruded in 60 secs. at 280° C. after 5 minutes preheating plus additional heating for the following minutes]

| Stabiliser | 1 | 5 | 10 | 15 | 20 |
|---|---|---|---|---|---|
| B(0.25%) plus A(0.25%) | 2.0 | 2.0 | 2.2 | 3.6 | 10.3 |
| B(0.25%) plus H(0.1%) | 2.1 | 2.4 | 2.9 | 3.5 | 4.6 |
| B(0.25%) plus H(0.25%) | 2.2 | 2.4 | 2.9 | 3.4 | 4.5 |
| B(0.25%) plus I(0.1%) | 2.0 | 2.0 | 2.2 | 3.7 | 10.3 |

We claim:

1. Stabilized compositions of polymers and copolymers of a member of the group consisting of branched-chain mono-α-olefins having 5 carbon atoms, 3-methylpentene, 4-methylpentene and 4,4-dimethylpentene which contain incorporated therein 0.0001 to 1.0% by weight of the polymer or copolymer of a phenol of the formula:

wherein A is a group of the formula:

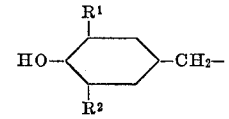

in which $R^1$ and $R^2$ are each alkyl groups containing from 1 to 12 carbon atoms or cycloalkyl groups containing from 5 to 7 carbon atoms, $R^3$ is a group A or an alkyl group containing from 1 to 12 carbon atoms, a hydroxyalkyl group containing from 2 to 3 carbon atoms or a cycloalkyl group containing from 5 to 7 carbon atoms and $R^4$ is a hydroxyalkyl group containing 2 to 3 carbon atoms or alternatively $R^3$ and $R^4$ together with the nitrogen atom form a heterocyclic ring selected from the group consisting of morpholine, piperidine and piperazine.

2. Stabilised compositions as claimed in claim 1 wherein the mono-α-olefin is 4-methylpentene-1.

3. Stabilised compositions as claimed in claim 1 wherein $R^1$ and $R^2$ are branched at the α-carbon atom.

4. Stabilised compositions as claimed in claim 1 wherein $R^3$ is a group of the formula represented by A.

5. Stabilised compositions as claimed in claim 1 wherein $R^4$ is a hydroxyalkyl group.

6. Stabilised compositions as claimed in claim 5 wherein the hydroxyalkyl group is a β-hydroxyethyl group.

7. Stabilised compositions as claimed in claim 1 wherein the phenol is N,N-di(3,5-ditert.-butyl-4-hydroxybenzyl)ethanolamine.

8. Stabilized compositions as claimed in claim 1 which contain also an antioxidant selected from the group consisting of 2,6-di-tert-butyl-4-methyl phenol, 4,4-thiobis(3-methyl-6-tert-butyl phenol), 1,3,5-trimethyl-2,4,6-tris(3′,5′-tert-butyl-4′-hydroxy-benzyl)benzene condensates of phenols with crotonaldehyde and glutaraldehyde, zinc dibutyldithiocarbamate, zinc dinonyldithiophosphate, dihexadecylthioether, and tris(nonylphenyl)phosphite in an amount between 0.005 and 1% by weight of the weight of polymer or copolymer.

References Cited

UNITED STATES PATENTS

| | | | |
|---|---|---|---|
| 2,802,810 | 8/1957 | Bill | 260—45.9 |
| 2,962,531 | 11/1960 | Coffield | 260—45.9 |
| 3,208,859 | 9/1965 | Coffield | 260—45.9 |
| 3,288,748 | 11/1966 | Cyba | 260—45.9 |

HOSEA E. TAYLOR, Primary Examiner

U.S. Cl. X.R.

260—23, 45.7, 45.85, 45.9, 45.95